UNITED STATES PATENT OFFICE.

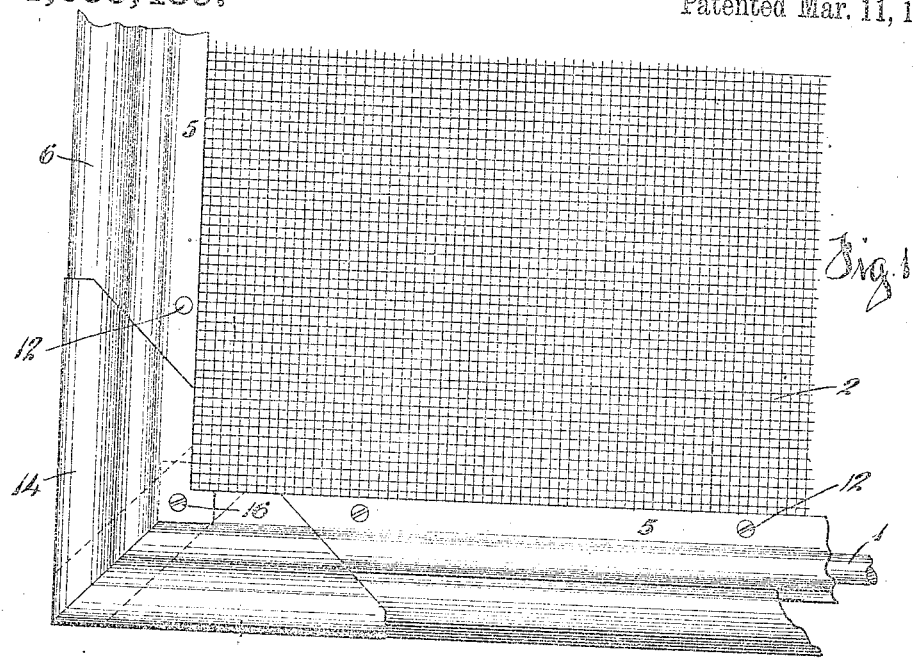
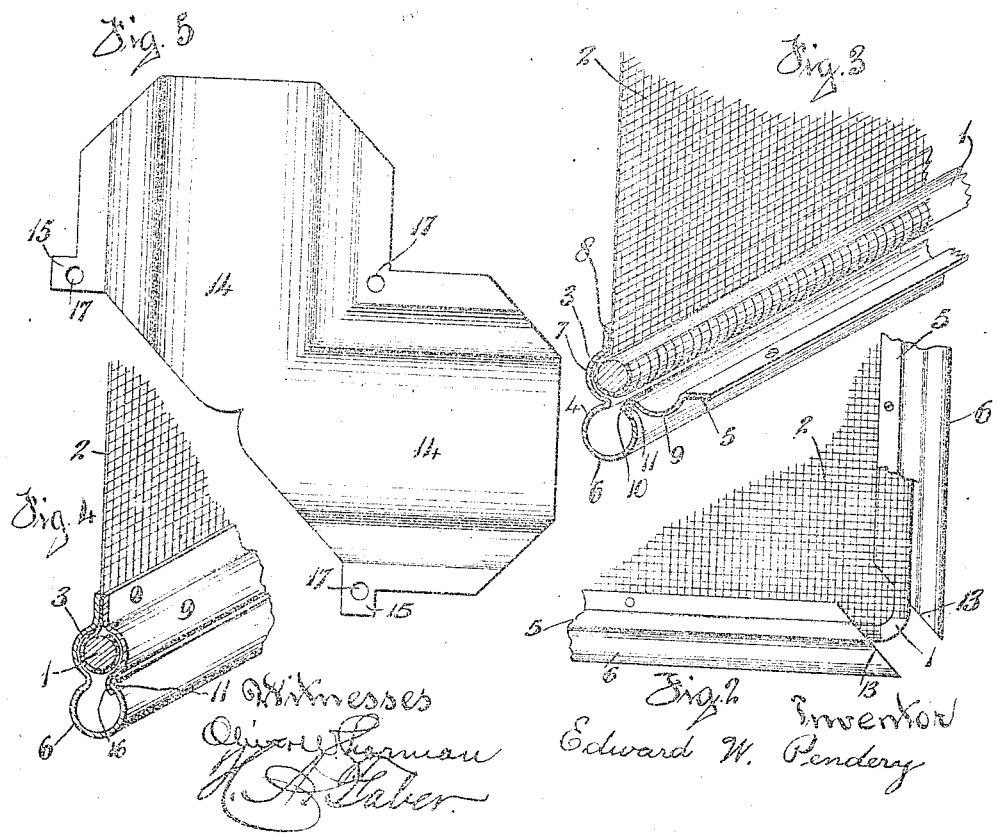

EDWARD W. PENDERY, OF NEWPORT, KENTUCKY.

WINDOW-SCREEN.

1,055,489.

Specification of Letters Patent.    Patented Mar. 11, 1913.

Application filed August 23, 1911. Serial No. 645,609.

*To all whom it may concern:*

Be it known that I, EDWARD W. PENDERY, a citizen of the United States, and a resident of the city of Newport, in the county of Campbell and State of Kentucky, have invented certain new and useful Improvements in Window-Screens, of which the following is a full, clear, and exact description, reference being had to the accompanying drawings, forming part of this specification.

The object of my invention is to provide metal frames for window screens which shall be strong and durable and readily and easily put together for any desired size of screen, and in which the frame molding shall be so constructed and arranged that the screen can be readily and easily rewired in the field, should the screening become worn or damaged.

My invention consists of that certain novel construction and arrangement of parts to be hereinafter particularly pointed out and claimed, whereby the molding and corner plates for the frame can be readily and easily opened up, the main frame rewired and the molding reclamped in place without difficulty or damage to the framework, which result is accomplished by constructing the molding with a removable plate for one side so arranged as to readily lock with the body of the molding when secured in place, but readily removed when desired.

In the drawings, Figure 1 is a plan view of one corner of my improved screen. Fig. 2 is a similar plan view with the corner plate removed and a portion of one of the removable molding plates broken away. Fig. 3 is a perspective view showing the method of securing the molding. Fig. 4 is a perspective cross-section of the molding frame when locked in position. Fig. 5 is a plan view of one of the corner plates opened out.

The main frame for holding the wire mesh for the screen is constructed of a substantial rod of wire 1, which is cut of the proper length, bent at the corners to form a rectangular frame of proper and desired size, with the ends of the rod secured together in any desired way. The main framework being formed in this way, the wire mesh 2 for the screen is cut of proper size and stretched over and curved around the rod 1, as shown at 3. The frame molding is then applied to properly cover the frame and edges of the wire. This molding is preferably formed in two parts, a main body portion 4 and a removable plate 5. The body of the molding is preferably formed with a cylindrical outer bead portion 6 to form a proper finish and give strength to the molding, and with a semi-circular portion 7 to embrace one side of the main frame and with a flange 8 to finish the construction for one side.

The removable plate 5 is formed with a semi-cylindrical portion 9 to embrace the other half of the frame, and with a tongue 10 along the inner side to engage and lock under the side edge 11 of the body of the molding. This molding is previously formed and bent as illustrated, and the main frame having been wired as above described, the molding is applied on one side, and the removable plate interlocked for the other side, and the two parts firmly drawn and secured together by the rivets or screws 12. For the corners, the ends of the molding are mitered as shown at 13, but it is not essential that these mitered ends should come together, and the lengths of the molding do not have to be accurately cut. The corners are protected and covered by the corner plates 14. These corner plates are formed as shown in Fig. 5, properly curved and bent to fit over the molding, and provided with ears 15, 15, which, when the corner plate is bent down, overlap, and the corner plates are secured by the single screw or rivet 16, to pass through the overlapping openings 17, 17, in the sides of the corner plates. In this way, the frame for the window screen can be readily and easily put together.

Should it be desired to renew the wire mesh, by removing the corner screw or rivet 16 and opening out the corner plates and removing the screws or rivets 12 and slipping out the removable plate 5, the main rod frame will be entirely released, and new wire mesh can be stretched thereover and the molding easily and readily replaced and secured by the rivets or screws.

Having thus described my invention, what I claim as new and desire to secure by Letters Patent, is:

1. In a window screen, the combination, with a wire rod main frame and wire mesh looped around the rod to secure the mesh to the frame, of a molding frame formed in a plurality of separable longitudinal sections, with the side edge of one section interlocked under the side edge of the other section, and securing devices to secure the opposite edge of the interlocked section in position on the main frame.

2. In a window screen, the combination, with a wire rod main frame and wire mesh looped around the rod to secure the mesh to the frame, of a molding frame formed in a plurality of separable longitudinal sections, with the side edge of one section interlocked under the side edge of the other section to embrace the main frame, and securing devices to secure the opposite edge of the interlocked section in position on the main frame, with corner plates to cover and protect the corners arranged to overlap, and a securing device to lock the corner plate to the main frame through the overlapping portion.

3. In a window screen, the combination, with a wire rod main frame and wire mesh looped around the rod to secure the mesh to the frame, of a molding frame comprising a body portion formed with a cylindrical outer bead and an inner semi-cylindrical portion with the semi-cylindrical portion embracing one side of the main frame, and a removable side plate having its side edge interlocked under the side edge of the cylindrical bead to complete the molding frame, with securing devices to secure the side plate to the main frame.

4. In a window screen, the combination, with a wire rod main frame and wire mesh looped around the rod to secure the mesh to the frame, of a molding frame comprising a body portion formed with a cylindrical outer bead and an inner semi-cylindrical portion with the semi-cylindrical portion embracing one side of the main frame, and a removable side plate having its side edge interlocked under the side edge of the cylindrical bead to complete the molding frame, with securing devices to secure the side plate to the main frame, and corner plates with overlapping portions to cover the corners, and a securing device to secure same in position on the main frame.

EDWARD W. PENDERY.

Attest:
H. A. FABER,
HORACE C. DRAKE.